United States Patent
Chiu

(10) Patent No.: US 8,212,914 B2
(45) Date of Patent: Jul. 3, 2012

(54) COMPUTATIONAL IMAGING SYSTEM

(75) Inventor: Chi-Wei Chiu, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 255 days.

(21) Appl. No.: 12/764,102

(22) Filed: Apr. 21, 2010

(65) Prior Publication Data

US 2011/0019068 A1    Jan. 27, 2011

(30) Foreign Application Priority Data

Jul. 24, 2009    (CN) .......................... 2009 1 0304765

(51) Int. Cl.
*H04N 5/232*    (2006.01)
*H04N 5/225*    (2006.01)
*H04N 5/238*    (2006.01)
*G03B 13/00*    (2006.01)
*H01L 27/00*    (2006.01)
*G06K 9/36*    (2006.01)

(52) U.S. Cl. ..... 348/345; 348/340; 348/363; 250/208.1; 382/232

(58) Field of Classification Search ............... 348/218.1, 348/335, 340, 345, 360, 362, 363, 367; 250/363.06; 378/2; 396/435
See application file for complete search history.

(56) References Cited

U.S. PATENT DOCUMENTS

| | | | |
|---|---|---|---|
| 6,737,652 B2* | 5/2004 | Lanza et al. ............. | 250/363.06 |
| 7,593,161 B2* | 9/2009 | George et al. ................. | 359/637 |
| 7,646,549 B2* | 1/2010 | Zalevsky et al. ............... | 359/738 |
| 7,792,423 B2* | 9/2010 | Raskar et al. .................. | 396/268 |
| 7,830,561 B2* | 11/2010 | Zomet et al. .................. | 358/484 |
| 7,888,626 B2* | 2/2011 | Slinger et al. ................. | 250/226 |
| 7,923,677 B2* | 4/2011 | Slinger ......................... | 250/216 |
| 7,965,936 B2* | 6/2011 | Raskar et al. .................. | 396/268 |
| 2002/0075990 A1* | 6/2002 | Lanza et al. ...................... | 378/2 |
| 2005/0030625 A1* | 2/2005 | Cattin-Liebl ................. | 359/560 |
| 2006/0157640 A1* | 7/2006 | Perlman et al. ............ | 250/208.1 |
| 2008/0088841 A1* | 4/2008 | Brady ............................ | 356/365 |
| 2008/0124070 A1* | 5/2008 | Liang et al. ................... | 396/435 |
| 2009/0022410 A1* | 1/2009 | Haskell ......................... | 382/238 |

(Continued)

FOREIGN PATENT DOCUMENTS

JP    2011166255 A  *  8/2011

(Continued)

OTHER PUBLICATIONS

Levin et al.; "Image and Depth from a Conventional Camera with a Coded Aperture"; Jul. 2007; ACM Transactions on Graphics (TOG)—Proceedings of ACM SIGGRAPH 2007; vol. 26 Issue 3.*

(Continued)

*Primary Examiner* — John Villecco
(74) *Attorney, Agent, or Firm* — Altis Law Group, Inc.

(57) ABSTRACT

An imaging sub-system, a liquid crystal (LC) element, and a digital focus processor are provided. The LC element is placed in the light path of the imaging sub-system, functioning as the aperture of the imaging sub-system, and includes a periodically patterned electrode which is patterned according to a periodical modulation function and configured to blur an intermediate image captured by the imaging sub-system by applying a controllable voltage thereto. The digital focus processor is configured to deconvolute the periodical modulation function to remove the blur away from the intermediate image and determine an all-in-focus real image.

5 Claims, 5 Drawing Sheets

U.S. PATENT DOCUMENTS

| | | | |
|---|---|---|---|
| 2009/0128682 A1* | 5/2009 | He et al. | 348/345 |
| 2009/0244300 A1* | 10/2009 | Levin et al. | 348/208.5 |
| 2010/0003024 A1* | 1/2010 | Agrawal et al. | 396/340 |
| 2010/0110179 A1* | 5/2010 | Zalevsky et al. | 348/135 |
| 2010/0201865 A1* | 8/2010 | Han et al. | 348/362 |
| 2011/0007306 A1* | 1/2011 | Jak et al. | 356/225 |
| 2011/0085051 A1* | 4/2011 | Chi et al. | 348/222.1 |
| 2011/0085074 A1* | 4/2011 | Sonoda et al. | 348/363 |
| 2011/0157393 A1* | 6/2011 | Zomet et al. | 348/222.1 |
| 2011/0249028 A1* | 10/2011 | Chang et al. | 345/643 |
| 2011/0267507 A1* | 11/2011 | Kane et al. | 348/241 |

FOREIGN PATENT DOCUMENTS

| | | | |
|---|---|---|---|
| WO | WO 02056055 A2 * | 7/2002 | |

OTHER PUBLICATIONS

Zhou et al.; "Coded Aperture Pairs for Depth from Defocus"; 2009; IEEE; 2009 IEEE 12th International Conference on Computer Vision.*

Zomet et al.; "Lensless Imaging with a Controllable Aperture"; 2006; IEEE; Proceedings of the 2006 IEEE Computer Society Conference on Computer Vision and Pattern Recognition.*

Fortunato et al.; "A Gentle Introduction to Coded Computational Photography"; Aug. 2011; 2011 24th SIBGRAPI Conference on Graphics, Patterns and Images Tutorials; pp. 39-55.*

Liang et al.; "Programmable Aperture Photography: Multiplexed Light Field Acquisition"; Aug. 2008; ACM Transactions on Graphics; vol. 27, No. 3, Article 55.*

* cited by examiner

COMPUTATIONAL IMAGING SYSTEM

BACKGROUND

1. Technical Field

The present disclosure relates to imaging systems and, particularly, to a computational imaging system.

2. Description of Related Art

Generally, an image of an object captured by conventional imaging systems is in focus only over a limited object distance range which is known as depth of field (DOF). Therefore, it is difficult to sharply capture object scenes that span large distances. To obtain an extended DOF, one attempt has been made that deliberately blurs an intermediate image captured by an imaging system by placing a coded aperture in the aperture of the imaging system and then digitally removes the blur using reconstruction algorithms. The coded aperture is patterned according to a modulation transfer function (e.g., a delta function). As such, reconstruction algorithms can effectively deconvolute the modulation transfer function and restores the image to a more recognizable likeness of the object with a greater DOF than what that would have been otherwise obtainable. This is known as coded aperture imaging and is one kind of computational imaging system. See Zand, J., "Coded Aperture Imaging in High Energy Astronomy", NASA Laboratory for High Energy Astrophysics (LHEA) at NASA's GSFC (1996); Levin, A., Fergus, R., Durand, F., Freeman, B., "Image and Depth from a Conventional Camera with a Coded Aperture", ACM Transactions on Graphics (Proc. SIGGRAPH) (2007); Veeraraghavan, A., Raskar, R., Agrawal, A., Mohan, A., Tumblin, J., "Dappled Photography: Mask Enhanced Cameras for Heterodyned Light Fields and Coded Aperture Refocusing", ACM Transactions on Graphics (Proc. SIGGRAPH) (2007); and Liang, C. K., Lin, T. H., Wong, B. Y., Liu, C., Chen, H. H., "Programmable Aperture Photography: Multiplexed Light Field Acquisition", ACM Transactions on Graphics (Proc. SIGGRAPH), Vol. 27, No. 3, Article No. 55 (2008). However, to blur the intermediate image, the coded aperture (e.g., the pattern formed on the coded aperture) also blocks large amounts of light rays incident on the aperture, resulting in large amount of light loss.

Therefore, it is desirable to provide a computational imaging system, which can overcome the abovementioned shortcomings.

BRIEF DESCRIPTION OF THE DRAWINGS

Many aspects of the present computational imaging system should be better understood with reference to the following drawings. The components in the drawings are not necessarily drawn to scale, the emphasis instead being placed upon clearly illustrating the principles of the present computational imaging system. Moreover, in the drawings, like reference numerals designate corresponding parts throughout the several views.

DETAILED DESCRIPTION

Embodiments of the present computational imaging system will now be described in detail with reference to the drawings.

Figure 1:
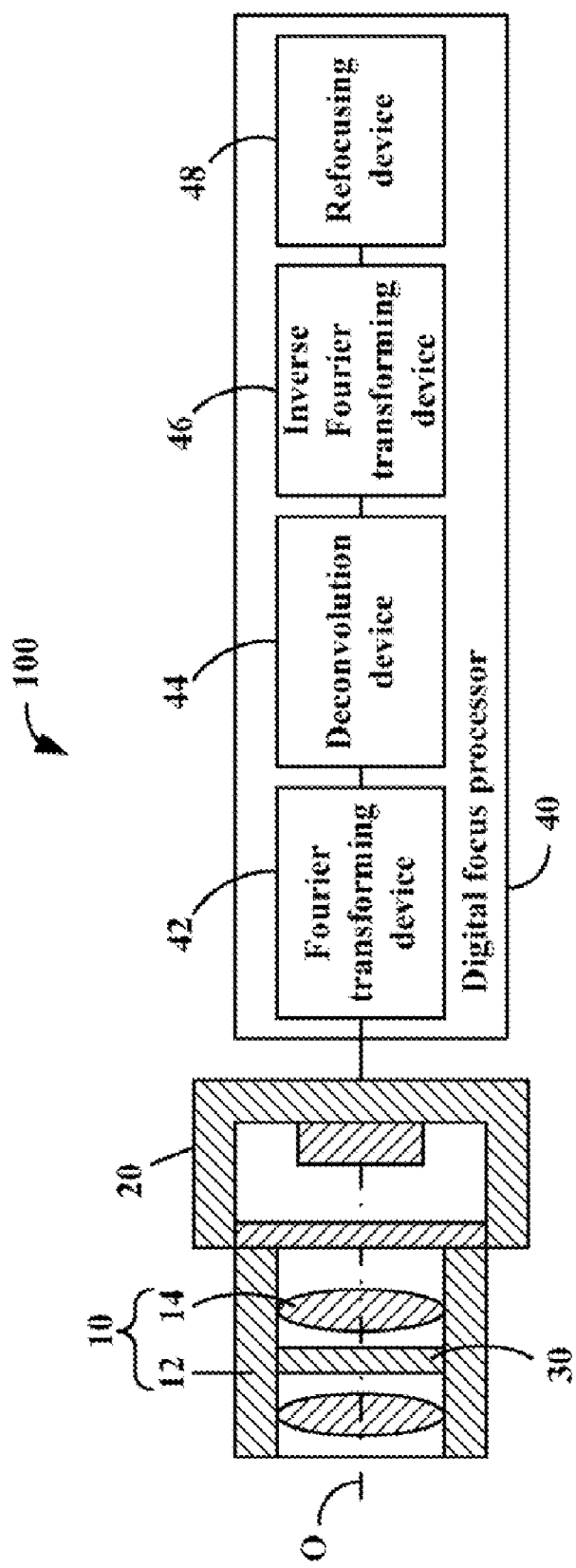
FIG. 1 is a schematic view of a computational imaging system, according to a first exemplary embodiment.
Figure 2:
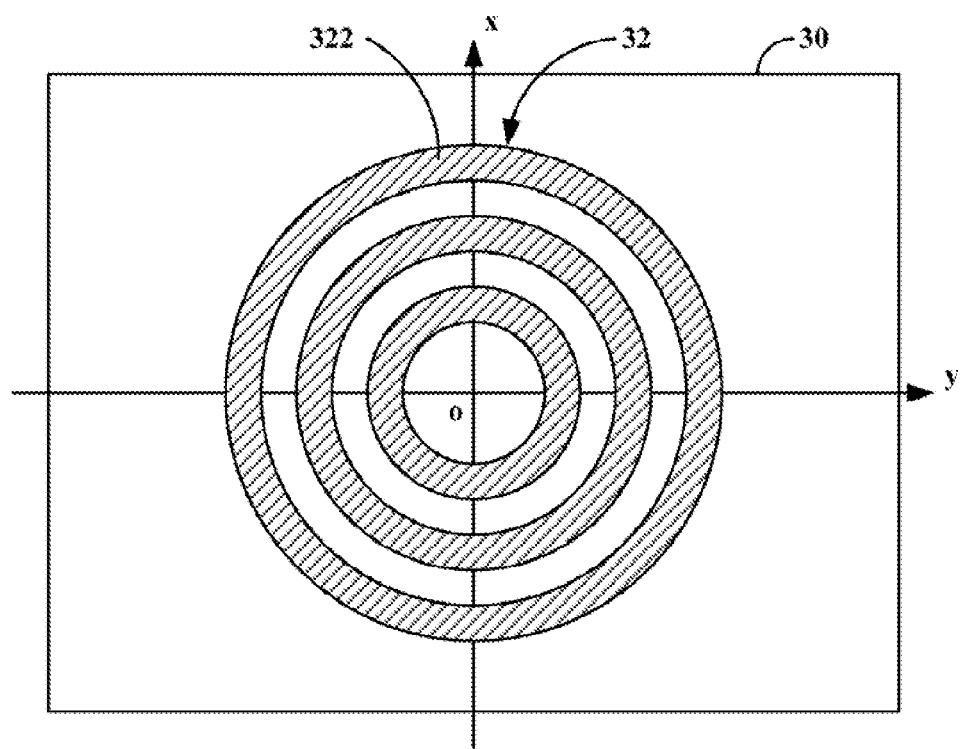
FIG. 2 is a planar view of a liquid crystal (LC) element of the computational imaging system of FIG. 1.

Referring to FIGS. 1 and 2, a computational imaging system 100, according to a first embodiment, includes a lens 10, an image sensor 20, an LC element 30, and a digital focus processor 40.

The lens 10 and the image sensor 20 constitute an imaging sub-system. The LC element 30 functions as the aperture of the imaging sub-system constituted by the lens 10 and the image sensor 20 (placed in the light path of the imaging sub-system).

The LC element 30 is a transmissive LC panel that has a periodically patterned electrode 32. The electrode 32 is patterned according to a periodical modulation transfer function (i.e., a spatial function):

$$H(x,y) = \cos 2\pi(s_x x + s_y y), \quad (1)$$

where an origin of the oxy coordinate system is the center of the LC element 30, the x axis extends along the widthwise direction of the LC element 30, the y axis extends along the lengthwise direction of the LC element 30, $s_x$ is a spatial frequency of the electrode 32 along the x axis, and $s_y$ is a spatial frequency of the electrode 32 along the y axis. Assuming that: (i) the refractive index of the LC element 30 outside the electrode 32 is $n_0$; and (ii) the refractive index of the LC element 30 at the electrode 32 is $n = n_0 + \Delta n$, where $\Delta n$ is the refractive index variance caused by applying a voltage to the electrode 32, the refractive index of the entire LC element 30 can be expressed as a refractive index function:

$$n(x,y) = n_0 + \Delta n \times \cos 2\pi(s_x x + s_y y). \quad (2)$$

Figure 3:
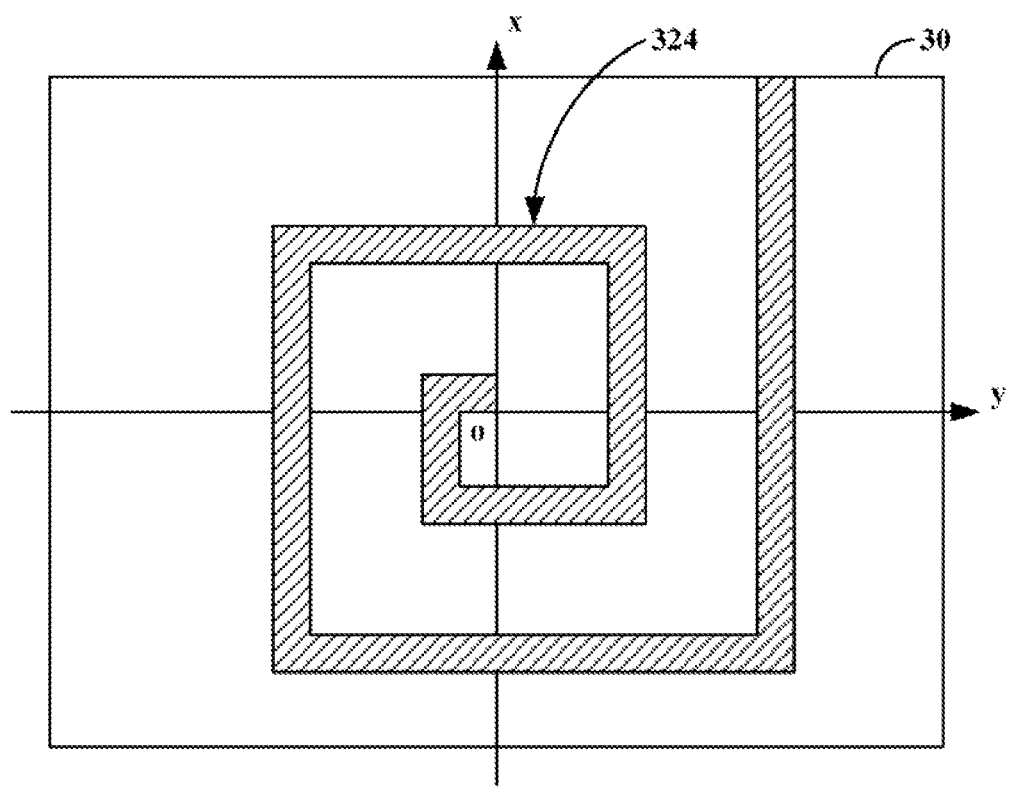
FIG. 3 is a planar view of the LC element, according to a second embodiment.
Figure 4:
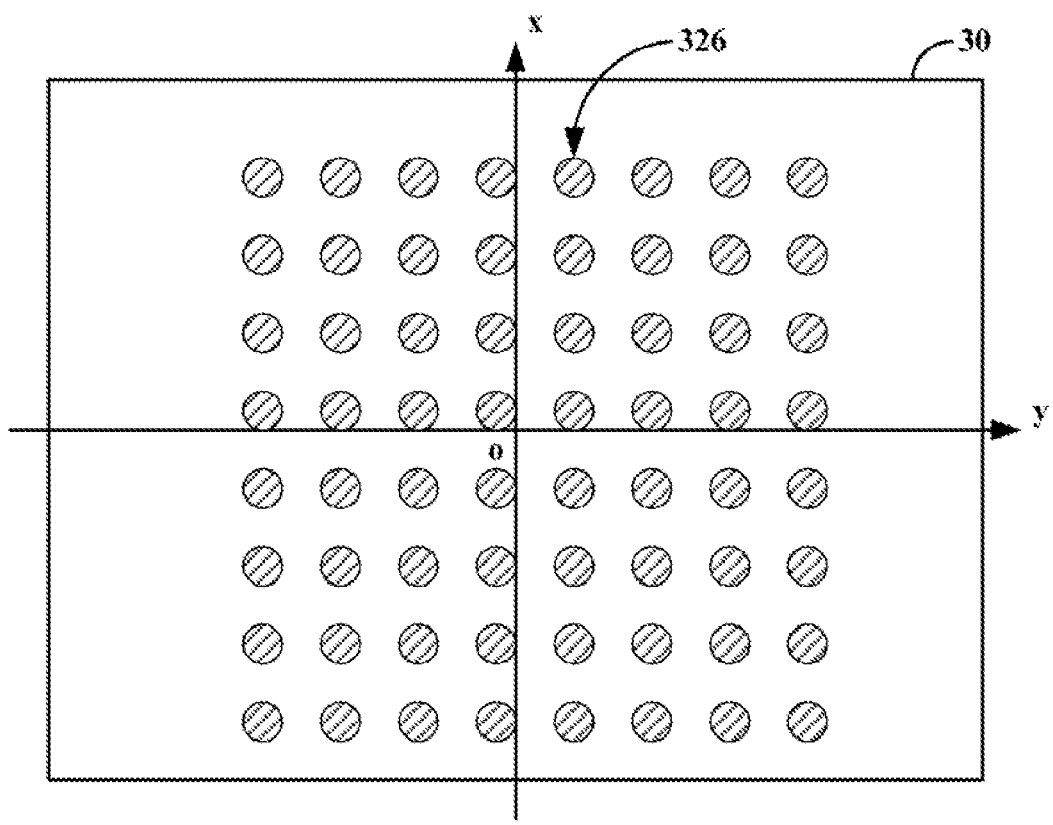
FIG. 4 is a planar view of the LC element, according to a third embodiment.
Figure 5:
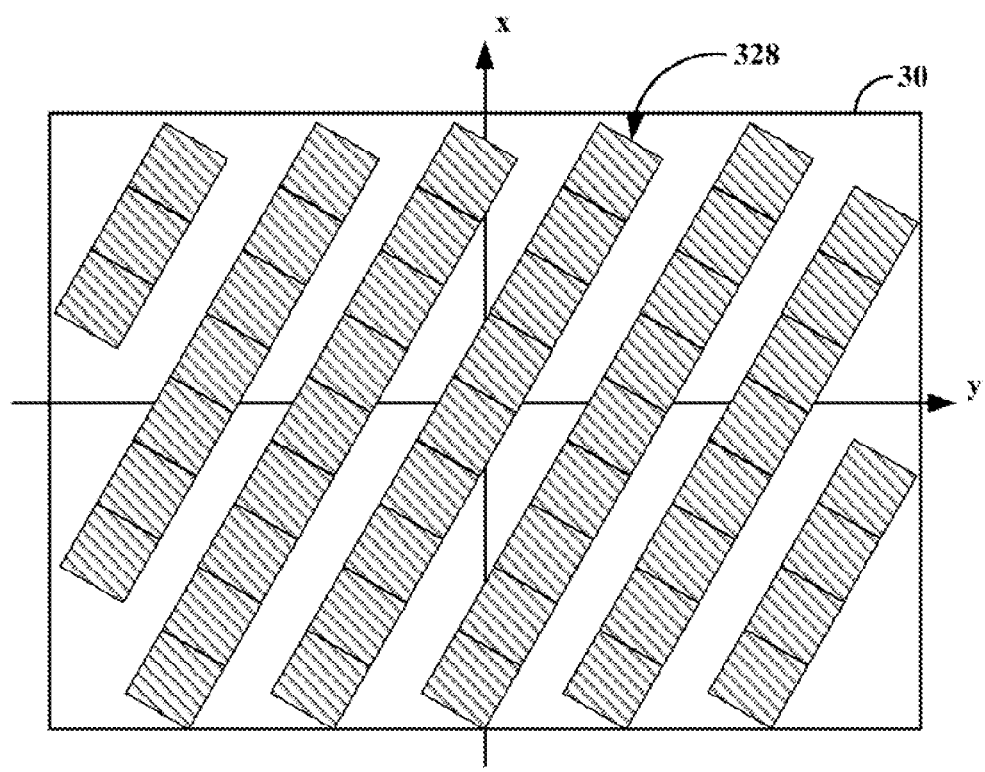
FIG. 5 is a planar view of the LC element, according to a fourth embodiment.

Also referring to FIG. 2, in this embodiment, the electrode 32 is a set of concentric annuluses 322 with uniform distances between each two adjacent annuluses 322. However, the electrode 32 is not limited to this embodiment, but can conform to other configurations, for example, a rectangular spiral line 324 as shown in FIG. 3, a circular dot array 326, or a rectangular block array 328 as shown in FIG. 5.

The digital Focus processor 40 includes a Fourier transforming device 42, a deconvolution device 44, an inverse Fourier transforming device 46, and a refocusing device 48.

The Fourier transforming device 42 is configured for transforming a space domain amplitude function $U_f(x,y)$ of an intermediate image captured by the image sensor 20 into a frequency domain function $U_f(x,y)$, where $f_x$, $f_y$ are x and y axes variables in the frequency domain, respectively. According to Fourier optics, it can be determined that:

$$U_f(f_x, f_y) = \frac{e^{\left[j\frac{1}{2f}(f_x^2+f_y^2)\right]}}{j\lambda f} \cdot \int\int_{-\infty}^{\infty} U_I(x,y) e^{-j\frac{2\pi}{\lambda f}(xf_x+yf_y)} dx\,dy, \quad (3)$$

where j is the imaginary unit, λ is a wavelength of light rays that captured by the image sensor 20, $f(x,y)$ is a focal length function of each point (e.g., pixel) (x,y) of the image sensor 20 to bring the corresponding point (x,y) into focus.

In addition, the Fourier transforming device 42 is also used for transforming the spatial function of the electrode 32 H(x, y) into a corresponding frequency domain function: $H_f(f_x, f_y)$.

According to complex optics, the function $U_f(f_x,f_y)$ is the convolution of a function $U_S(x,y)$ and the function $H(x,y)$, that is, $$U_f(x,y)=U_S(x,y)\cdot H(x,y), \qquad (4)$$

wherein the function $U_S(x,y)$ is a spatial domain amplitude function of a real (final) image of objects. As such, to obtain the real image of the objects, the function $U_f(f_x,f_y)$ must go through deconvolution to obtain the function $H_f(f_x,f_y)$. This is accomplished by the deconvolution device 44. According to mathematics, it can be determined that:

$$U_f(f_x,f_y)=F(U_S(x,y))\cdot H_f(f_x,f_y), \qquad (5)$$

where $F(U_S(x,y))$ is the Fourier transform of the function $U_S(x,y)$. As such, deconvoluting of the function $U_f(f_x,f_y)$ can be expressed as:

$$F(U_S(x,y))=\{F\}^{-1}(U_f(f_x,f_y))\otimes H_f(f_x,f_y). \qquad (6)$$

As such, the blur caused by the electrode 32 is digitally removed.

The inverse Fourier transforming device 46 is configured for inversely transforming the frequency domain function $F(U_S(x,y))$ into the spatial domain amplitude function $U_S(x,y)$ to restore the real image of the objects.

According to the above, it can be determined that the resulting function $U_S(x,y)$ is a function of three variables: x, y, and $f(x,y)$. Therefore, for each point (x,y) of the real image, the unique in-focus focal length $f(x,y)$ can be determined. The refocusing device 50 is configured to determine the unique in-focus focal length for each point (x,y) of the real image to bring all points of the real image into focus. As such, an all-in-focus real image of the objects can be obtained.

By employing the LC element 30, transmittance of the electrode 32 can be controlled by adjusting the voltage applied thereto. As such, the amount of light loss can be controlled and minimized. Typically, to reduce light loss, a transmittance of the electrode 32 is greater than about 50%.

It will be understood that the above particular embodiments and methods are shown and described by way of illustration only. The principles and the features of the present disclosure may be employed in various and numerous embodiment thereof without departing from the scope of the disclosure as claimed. The above-described embodiments illustrate the scope of the disclosure but do not restrict the scope of the disclosure.

What is claimed is:

1. A computational imaging system comprising;
   an imaging sub-system;
   a transmissive liquid crystal (LC) element placed in the light path of the imaging sub-system and functioning as the aperture of the imaging sub-system; the LC element comprising a periodically patterned electrode which is patterned according to a periodical modulation function and configured to deliberately blur an intermediate image captured by the imaging sub-system by applying a controllable voltage thereto; and
   a digital focus processor configured to deconvolute the periodical modulation function to remove the blur away from the intermediate image and determine an all-in-focus real image.

2. The computational imaging system of claim 1, wherein the periodical modulation function is:

$$H(x,y)=\cos 2\pi(s_x x+s_y y)$$

where the origin of the oxy coordinate system is the center of the LC element, the x axis extends along the widthwise direction of the LC element, the y axis extends along the lengthwise direction of the LC element, $s_x$ is a spatial frequency of the electrode along the x axis, and $s_y$ is a spatial frequency of the electrode along the y axis.

3. The computational imaging system of claim 2, wherein the electrode is selected from the group consisting of: a set of concentric annuluses, a rectangular spiral line, a circular dot array, and a rectangular dot array.

4. The computational imaging system of claim 1, wherein a transmittance of the electrode is controlled above 50% by the controllable voltage.

5. The computational imaging system of claim 1, wherein the digital focus processor comprising:
   a Fourier transforming device being configured for transforming a spatial amplitude function of the intermediate image and the periodical modulation function into a frequency intermediate image function and a frequency modulation function;
   a deconvolution device being configured to deconvolute the periodical modulation function using the frequency intermediate image function and the frequency modulation function to produce a frequency real image function;
   an inverse Fourier transforming device being configured for transforming the frequency real image function into a spatial real image amplitude function; and
   a refocusing device being configured for determining a focal length of each point of the all-in-focus real image according to the spatial real image amplitude function.

* * * * *